Figure 1:
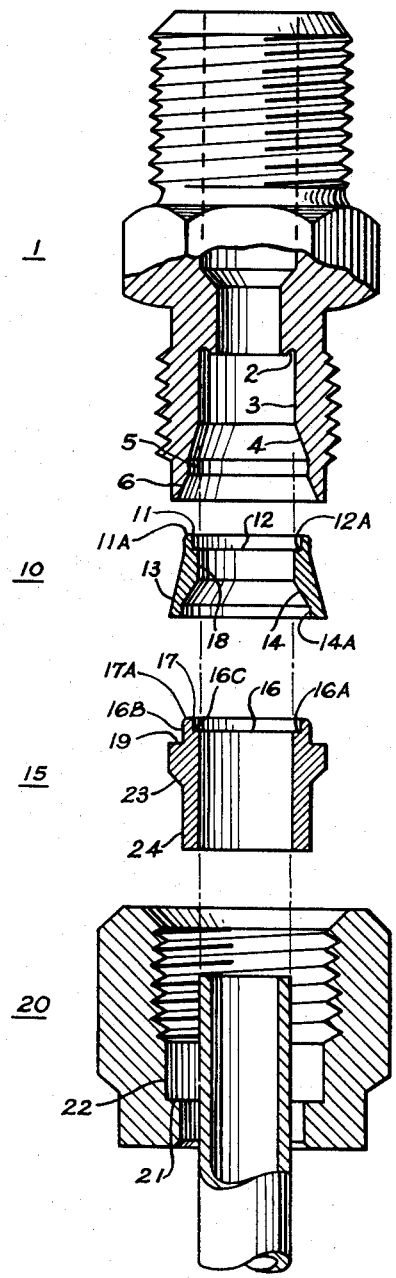

INVENTOR.
CULLEN B. CRAWFORD

INVENTOR.
CULLEN B. CRAWFORD
BY
ATTORNEY

United States Patent Office 3,069,188
Patented Dec. 18, 1962

3,069,188
TUBE COUPLING
Cullen B. Crawford, Cleveland, Ohio
(25700 Lakeland Blvd., Euclid 32, Ohio)
Filed Jan. 26, 1961, Ser. No. 85,156
2 Claims. (Cl. 285—342)

This invention relates to tube couplings, and, more particularly, the invention relates to couplings with parts made of metallic material comprising collet members deformed inwardly on the tube surface to retain and seal the coupling to the tube. This application is a continuation-in-part of my copending application Serial No. 712,719, filed February 3, 1958, and now abandoned.

The development of the many and varied forms for tube coupling structures has been stimulated by the variety of materials available for both couplings and tubes as well as the varied conditions of service. Requirements for the couplings are, broadly, simple; the couplings must not leak, they must function efficiently after frequent connection and disconnection, they must give minimum deformation to the tube, they must function efficiently under vibration, pressure and temperature variations, and they must effectively resist any chemical characteristics of the fluids conducted through the tube.

Edges of collet members of prior art couplings have been deformed toward the tube surfaces to throw up chips of tube material in gripping the tubes. However, the grain structure of the tube wall will be split by collet edges directed continuously across the longitudinal grain formation of the tube wall material. When the entire tube wall is thus split, the coupling and sealing function will fail. Division of the holding function among a series of chips spaced along the tube has not solved this problem.

Swaging the tube with deformed coupling members has been used as an alternate to, and in combination with, chipping. However, swaging will reduce the tube diameter below satisfactory limits. Also, holding the tubes by swaging coupling parts has generally proven to be a weak union from which the tube slips under the greater pressures.

A principal object of the present invention is to hold tubes in couplings by forming an abutment of the tube material and using a flat surface of the coupling to prevent displacement of the tube from the coupling.

Another object of the invention is to couple to a tube with structure which forms a plurality of seals, each of which utilize a separate abutment of the tube material placed against a flat surface of the coupling structure.

The present invention contemplates a coupling for tubes comprising a male connector into which a nut is threaded, capturing a collet member between them. As the connector and nut are brought together, the collet between them is deformed, by cam surfaces of the male connector and nut, into the surface of the tube. The collet is shaped to cold flow the tube material by scraping up material of the tube into abutments as it is deformed and to have a flat surface of the collet brought against the abutment to prevent displacement of the tube from the coupling and to seal the tube to the coupling.

Another aspect of the invention contemplates a tube coupling in which a single collet has a plurality of edges which are cammed into the tube surface to cold flow the tube material by scraping up abutments of the tube material against each of which a flat surface of the collet is brought by further distortion of the collet. The further distortion of the collet relieves the collet edges from their direction toward the tube axis so the resistance to longitudinal displacement forces on the tube is by the flat surfaces of the collet which also seal to the tube abutments.

Another aspect of the invention contemplates a tube coupling in which a plurality of collets each have a plurality of edges which are cammed into a tube surface to individually cold flow the tube material by scraping up abutments. The collets are further cammed to relieve the direction of the edges from toward the tube axis and simultaneously bring flat collet surfaces adjacent the edges of the collet against the abutments of tube material to prevent longitudinal displacement of the tube from the coupling and seal to the tube abutments.

Other objects, features and advantages of the invention will be apparent from the drawings, specification and claims.

Figure 2:
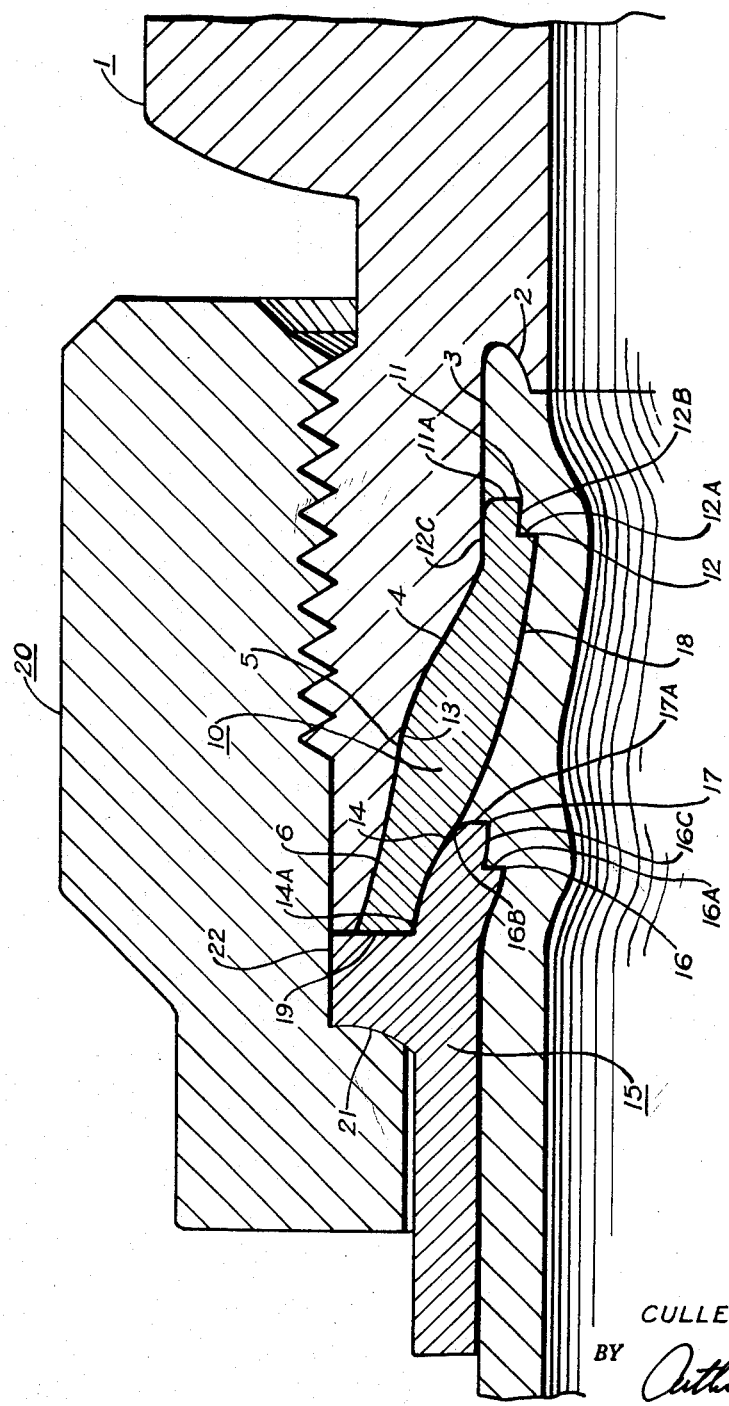

In the drawings, wherein illustrative embodiments of this invention are shown and wherein like reference numerals indicate like parts:

FIG. 1 is a sectioned elevation of the various components of the coupling in which the invention is embodied, arranged in the order of assembly into a complete coupling on a tube; and FIG. 2 is a sectioned elevation of a portion of the coupling as made up into an operative coupling to illustrate the function of the various components of the coupling structure under the teachings of the invention.

The preferred embodiment of the invention illustrated is to be considered in its four parts. The body male connector is threaded into the nut. Captured between these two elements are two collets with which four seals are formed directly with the material of the external surface of the tube.

FIG. 1 of the drawings shows the four parts of the coupling arranged in the order of assembly into a complete coupling on the tube. As these parts are drawn together, by threaded engagement of the body-male connector and nut, they form the effective seal by the resulting deformations of the collets by cam surfaces.

FIG. 2 illustrates the "drawn-up" relation of the coupling units. In this position illustrated with FIG. 2, the components complete the coupling action with the tube, carrying out the objects of the invention.

The four seals of the preferred embodiment are formed, essentially, from material of the tube wall itself. Tube material is cold-flowed by scraping the tube material into abutments with "lips" of the collets by camming the collets into the material of the tube wall with various surfaces of all four coupling parts.

If the function of the coupling is to be clearly understood, the various camming actions must be individually analyzed. Theoretically, the camming actions could take place in sequence. The sequence could be described as beginning from either the nut on the one end and occurring toward the body or occurring from the body back toward the nut. They will be described as occurring from the flanging of the tube end on the concave radius of the tube seat within the body-male connector back toward the camming action between the nut and the rear collet. However, it is emphasized that the sequence of the deformation of the collets in forming the four seals is not significant. Each function of deformation, in creating a seal, could take place in any order desired and the overall function of the coupling would be effective in carrying out the objects of the invention.

The body-male connector 1 may now be examined in its cooperation with the front collet. The outward upset 2 forms a seat for the tube end. The surface of upset 2 presents a concave radius with respect to the tube end brought against it. A flange is formed on the tube end as the tube is forced into the body 1 from the finger-tight position.

This arrangement of upset 2 in body 1 is to be contrasted with prior art arrangements which have utilized a straight, conical surface with which to form tube flanges on their ends. Forcing a tube end against the cone surfaces of the prior art upsets has caused the tube material to seize and gall on the conical surface. The seizing and galling is brought about by the production of longitudinal tube stresses because of the demands for abrupt changes in the direction of movement of the tube material. In many instances the resulting tube stresses become localized or concentrated to the point where the tube is split and its coupling made correspondingly defective. A tube flange formed against concave upset 2 is free of cracks or splits because of the relatively smooth forming action with which the flange is produced.

Extending back from the surface of upset 2 is an internal surface of body 1, designated as the first sealing surface 3. Against this surface 3 the lip shoulders of the first collet "shuttle" in completing the first pair of seals. Also, it is this surface against which the tube is bulged outwardly, immediately back of its flared end position formed by upset 2. In addition to the four main seals formed by the coupling, this contact function between the external tube wall and sealing surface 3 offers a high degree of sealing function which helps carry out the objects of the invention.

Sealing surface 3 is a portion of the bore through body 1. This surface is not cylindrical, but is given a slight conical angle, in the order of 1°, outwardly from upset 2. Therefore, when the coupling is disassembled, the tube wall sealed against this surface 3 will have its union readily broken with surface 3. Frequent assembly and disassembly will not alter the effectiveness of the seal between these two surfaces.

The first camming surface 4 flares outwardly from first sealing surface 3, as an additional portion of the bore of body 1. Against this surface, the shoulders of the lip of the first collet are cammed inwardly.

The degree of outward taper of the conical surface 4 is established to permit the first collet to travel longitudinally a distance in which the collet lips will cold flow the tube material by scraping up abutments of the tube material. The collet lips will then be carried beyond surface 4 and shuttle toward their original direction against the first sealing surface 3.

Surfaces 5 and 6 complete the bore of body 1. Surface 5 is a simple, cylindrical counterbore which receives the lip of the first collet prior to its deformation by cam surface 4. Cam surface 6 is a second camming surface having a taper less than the taper of cam surface 4. This second camming surface is brought against the rear portion of the first collet to cam the rear of the first collet inward.

Attention is next turned to first collet 10 as it is forced into body 1 and onto the camming surfaces internal of the body 1. The lip of the first collet 10 is disclosed with two scraping edges 11 and 12 and with two flat surfaces 11A and 12A adjacent the edges. The edge 12 and flat surface 12A are formed by a simple, cylindrical, counterbore of the collet 10. A slight bevel is given this lip of the first collet, on its outer edge, the better to have the lip respond to camming against the first camming surface 4. The counterbore leaves an internal cylindrical surface 12B between the edge 11 and flat surface 12A. A similar cylindrical flat surface 12C is formed radially spaced from the surface 12B on the external surface of the collet, to the rear of the slight bevel given the lip.

It is easily appreciated that as the lip of collet 10 cams against surface 4, the edges 11 and 12 are forced into the surface of the tube. As the edges scrape into the tube surface, and with the collet 10 continuing on into body 1, the edges cold flow an abutment of the tube material in front of each edge. When the lip reaches the end of camming surface 4 its surface 12C "shuttles" back toward its original, finger-tight, position against the first sealing surface 3 under the force of the tube bulging outward, toward surface 3. The abutments of tube material and lip surfaces 11A and 12A are thereby locked together against surface 3 in forming two of the major seals of this embodiment of the coupling.

To completely appreciate the seal formation by the collet lips, the function of the lips must be compared with the performance of wedges provided in the prior art which are well known in their function of throwing up chips of tube material. A degree of holding action is obtained by prior art wedges but at prohibitive cost. This cost is developed from the fact that bringing the sharp edges of the wedges into the tube material at approximately 45°, and maintaining this angle constant, grain cleavage of the tube material is brought about. This cleavage of grain, is the beginning of complete fracture, or splitting, of the tube wall. The normal stress of use, placed on the tube, causes the cleavage to progress and ultimately result in tube and coupling failure.

The present invention contrasts with the prior art arrangement by bringing the scraping edge of the lip into the material of the tube surface at a sufficiently small angle of approach to the tube wall that it travels along the tube length a distance approximately four times that normally required of chip type wedges. The resulting action of tube material displacement is not one of chip production, the chips curling backward from the edge travel, but a scrape action which causes cold flow of the tube material. Then, after the low-angle scraping action approach, which develops an abutment of tube material, by cold flow, the lip is shuttled back toward its original position. The scraping edge of the lip is thereby displaced from its direction of travel toward the axis of the tube and the flat front surface of the lip structure is brought against the abutment of tube material. This arrangement of structure results in the tube being held by the flat frontal surfaces of the lip against the abutments of tube material as compared to the sharp edge of prior art wedges arranged to split along the grain structure of the tube material.

With the completion of the first pair of seals, the back portion of the first collet is examined as engaging the second camming surface 6 of body 1. The back portion of collet 10 is in the form of a conical frustum whose external surface 13 extends from external cylindrical surface 12C. This surface 13 engages the second camming surface 6, is forced inward, toward the tube axis and brought under the first locking surface 5 of the body. Thus, not only is the lip of the collet 10 held under surface 3, but a portion of the rear of collet 10 is locked under the cylindrical surface 5 of body 1. With the first, or front, collet 10 brought into full engagement with body 1 and the tube, the second, or rear, collet can be analyzed as it is brought into the camming surface within the first collet.

The first collet 10 has the surface of a conical frustum formed internal of its rear portion, as a portion of the collet bore and as the third cam surface 14. Against this surface the lip of the second collet 15 is cammed to bring its scraping edges into the tube. A finite length of cylindrical internal surface at the entry to the internal conical frustum 14 of the first collet 10 is provided at 14A to give positive guidance for the lip of the rear collet in bringing this lip against the cam surface of the conical frustum 14.

Similar to collet 10, collet 15 has a slightly beveled lip with two scraping edges 16, 17, and adjacent flat surfaces 16A and 17A. The lip is guided against surface 14, and the subsequent camming of the edges into the tube surface form the second pair of seals of the four main seals of this embodiment of the invention. The lip shuttles up against the second cylindrical sealing surface 18 to bring cylindrical surface 16B against surface 18 to complete the lip-surface tube material abutment seal structure. The shoulder 19 of collet 15 eventually abuts the end of collet 10.

Between scraping edge 17 and flat surface 16A is formed a cylindrical surface 16C concentrically spaced inwardly from surface 16B. This surface 16C is similar to surface 12B in that it ultimately is shuttled into sealing relation with a substantially cylindrical sealing surface 18 which is a portion of the bore of collet 10. In being so shuttled, this surface is positioned to prevent the edges 16 and 17 from cutting across the grain of the tube coupled and to bring their adjacent flat surfaces against the tube abutments developed by cold flow of the tube material.

Nut 20 has female threads adapted to engage the male threads of body-male connector 1. There is a single, internal shoulder 21 of this nut 20. Between this shoulder 21 and the female threads a slight outward taper is given surface 22. Surface 22 engages the outer surface of collet 15, specifically the surface between shoulder 19 which faces collet 10 and the shoulder 23 which faces nut 20.

As nut 20 is threaded to body 1, the rear portion of rear collet 15 is accommodated loosely through its bore. However, surface 22, tapering outward slightly, to the right, contacts the surface between shoulder 19 and shoulder 23. The tapering surface 22 cams the collet material beneath the surface inwards and, deformed in this manner, this portion of the second collet grips the tube with a force which seals to a degree with a compression type of seal having sufficient strength to dampen vibration of the tube from up-stream or down-stream forces. Further, this portion of the seal system is effective in resisting beat or surge in the fluid within the tube. The camming is completed with contact between shoulder 21 and the shoulder 23.

Particular note is taken of the compressive force developed upon the rear of collet 10 as its initial surface 14 is caused to cam the lip of collet 15 inward. The rear of collet 10, the surface 13, is brought under cam surface 6. Further, internal surface 22 is brought over the rear of body 1, internal surface 6 and surface 13 as the lip of collet 15 is worked by the internal cam surface 14. The result is a highly developed compressive force inwardly on the collets and their lips to render the seals between their flat surfaces and the tube material abutments efficient.

In final assembly, the function of cylindrical surfaces 12B and 16C should be understood. These surfaces form flat surfaces 12A and 16A. In assembly, with these flat surfaces shuttled properly against their abutments of tube material, these surfaces 12B and 16C bear on the tube wall as a limit stop to any radial cutting action of edges 12 and 16. As the tube temperature changes, these flat surfaces 12B and 16C prevent the edges 12 and 16 from cutting the tube as the tube contracts and expands.

FIG. 2 is used to give a better understanding of the actual shapes to which the coupling parts, and tube, are brought in the completed union. A bare description of the flaring, bulging, camming, scraping, shuttling and locking functions is not adequate to picture the final distortion given the shapes of the coupling parts after having been taken through these functions. FIG. 2 is based on studies made of cut-away models of an actual reduction to practice. It is used to give an idea of the distortion given the tube wall by the collets of the coupling and the abutments developed on the tube surface with which the seals are formed.

FIG. 2 shows the tube-end flared by surface 2. It is not emphasized in the drawing, but a bulging force directs the external wall of the tube against first locking surface 3 of body 1.

Front collet 10 is given the most over-all distortion when the coupling is drawn-up. The front flat surfaces are indicated in FIG. 2 as having cold flowed the tube material into abutments. After having gone through their scraping and shuttling functions, their outlines have become modified from their FIG. 1 illustration. Surfaces 13, 14 and 18 are particularly hard to clearly identify because they have taken on some of the direction and shape of body 1 surfaces 4, 5 and 6 and have been distorted by the camming action given the lip of rear collet 15. Nevertheless, an indication has been given to their relative locations in FIG. 2.

A slight emphasis has been given the shape of the worked tube surface to indicate the abutments formed for the seals. It is fairly easy to appreciate the four separate seals developed by the scraping edges of the collet lips. The fact is not quite as apparent that the edges 11, 12, 16 and 17 have been relieved by the "shuttling" against surfaces 3 and 18. However, this relief takes place, leaving the sealing and holding forces between the collets and tube abutments to be developed between the front flat surfaces and the abutment material.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:
1. A tube coupling comprising;
    a body member receiving a tube axially in a bore for coupling to the tube;
    an abutment formed within the bore of the body member against which the end of the tube is received;
    first sealing surface formed in the body member bore in the form of a coaxial bore with a 1° flare outwardly and bearing on the external surface of the tube in sealing relation to the tube surface when the tube is bulged outwardly as the end of the tube is forced against the body abutment;
    a first camming surface adjacent the first sealing surface in the form of a first outwardly flaring conical coaxial bore;
    first locking surface adjacent the first camming surface in the form of a second coaxial bore which is cylindrical;
    a second camming surface adjacent the first locking surface in the form of a second outwardly flaring conical coaxial bore;
    first collet member receiving the tube in a bore and positioned adjacent the body and having;
        (a) a first cylindrical and coaxial surface through which the tube passes,
        (b) a second cylindrical and coaxial surface which is a counterbore of the first,
        (c) a third cylindrical and coaxial surface concentric and parallel the second cylindrical and coaxial surface in forming a lip,
        (d) a first flat surface at the front of the front of the collet in a plane normal the collet and tube axis and extending between the two concentric surfaces,
        (e) a second flat surface formed by the counterbore of the first cylindrical and coaxial surface,
        (f) a sharp edge formed on each inner edge of each flat surface,
        (g) and an external conical surface adjacent the lip and sized to be cammed inwardly by the first and second camming surfaces and held by the first locking surface;
    and a nut member slideable along the tube and threadedly engaging the body member to capture the collet member therebetween and providing an internal abutment shoulder which exerts a force on the collet member to drive the lip against the camming surfaces of the body and cause the lip to deform into the tube surface at an angle so small that tube material is scraped up and cold flowed into abutments by the sharp edges traveling along the length of the tube approximately four times that normally required for the travel of chip type wedges and bring only the flat surfaces adjacent the edges against the abutments of tube material when the lip is shuttled toward its original direction.

2. A tube coupling comprising;
a body member receiving a tube axially in a bore for coupling to the tube;
an abutment formed within the bore of the body member against which the end of the tube is received;
a sealing surface formed in the body member bore in the form of a cylindrical coaxial bore with a 1° outward flare and bearing on the external surface of the tube in sealing relation to the tube surface when the tube is bulged outwardly as the end of the tube is forced against the body abutment;
a first camming surface adjacent the sealing surface in the form of a first outwardly flared conical coaxial bore;
a locking surface adjacent the first camming surface in the form of a second coaxial bore which is cylindrical;
a second camming surface adjacent the first locking surface in the form of a second outwardly flared coaxial bore;
a first collet member receiving the tube in a bore and positioned adjacent the body and having;
(a) a first cylindrical and coaxial surface through which the tube passes,
(b) a second cylindrical and coaxial surface which is a counterbore of the first,
(c) a third cylindrical and coaxial surface concentric and parallel the second cylindrical and coaxial surface in forming a lip,
(d) a first flat surface at the front of the collet in a plane normal the collet and tube axis and extending between the two concentric surfaces,
(e) a second flat surface formed by the counterbore of the first cylindrical and coaxial surface,
(f) a sharp edge formed on each inner edge of each flat surface,
(g) an external conical surface adjacent the lip and sized to be cammed inwardly by the first and second camming surfaces and held by the first locking surface,
(h) and an internal conical surface outwardly flared from the first cylindrical and coaxial surface;
a second collet member about the tube and comprising,
(a) a first cylindrical and coaxial surface through which the tube passes,
(b) a second cylindrical and coaxial surface which is a counterbore of the first,
(c) a third cylindrical and coaxial surface concentric and parallel the second cylindrical and coaxial surface in forming a lip positioned to contact the internal conical surface of the first collet member and be cammed into the surface of the tube,
(d) a first flat surface at the front of the collet in a plane normal the collet and tube axis and extending between the two concentric surfaces,
(e) a second flat surface formed by the counterbore of the first cylindrical and coaxial surface,
(f) a sharp edge formed on each inner edge of each flat surface,
(g) and an external shoulder against which the internal abutment shoulder of a nut member bears in exerting its force on the lips of both collets in causing their edges to be cammed against their respective camming surfaces and deformed into the surface of the tube to form the sealing abutment-surface arrangement of the coupling;
and a nut member slideable along the tube and threadedly engaging the body member and providing an internal abutment shoulder which exerts a force on the external shoulder of the second collet member in causing the edges of both lips to be cammed against their respective camming surfaces and into the surface of the tube at an angle so small that tube material is scraped up and cold flowed into abutments by travel of the edges along the tube length approximately four times that normally required of chip type wedges and bring only the flat surfaces adjacent the edges against the abutments of tube material when the lips are shuttled toward their original direction.

References Cited in the file of this patent
UNITED STATES PATENTS

| | | |
|---|---|---|
| 2,139,413 | Kreidel | Dec. 6, 1938 |
| 2,211,856 | Kreidel | Aug. 20, 1940 |
| 2,252,920 | Edelmann | Aug. 19, 1941 |
| 2,349,180 | Lamong | May 16, 1944 |
| 2,405,822 | Franck | Aug. 13, 1946 |
| 2,484,815 | Crawford | Oct. 18, 1949 |
| 2,536,552 | Katz | Jan. 2, 1951 |
| 2,544,108 | Richardson | Mar. 6, 1951 |
| 2,701,149 | Kreidel | Feb. 1, 1955 |
| 2,761,704 | Crawford | Sept. 4, 1956 |
| 2,873,985 | Baldwin | Feb. 17, 1959 |